(12) United States Patent
Tipton

(10) Patent No.: US 9,305,391 B2
(45) Date of Patent: Apr. 5, 2016

(54) APPARATUS AND METHODS FOR DETAILING SUBDIVISION SURFACES

(71) Applicant: 3D SYSTEMS, INC., Rock Hill, SC (US)

(72) Inventor: Robert Tipton, Woburn, MA (US)

(73) Assignee: 3D Systems, Inc., Rock Hill, SC (US)

(*) Notice: Subject to any disclaimer, the term of this patent is extended or adjusted under 35 U.S.C. 154(b) by 0 days.

(21) Appl. No.: 14/212,450

(22) Filed: Mar. 14, 2014

(65) Prior Publication Data

US 2014/0267268 A1 Sep. 18, 2014

Related U.S. Application Data

(60) Provisional application No. 61/799,002, filed on Mar. 15, 2013.

(51) Int. Cl.
*G06T 15/04* (2011.01)
*G06T 17/00* (2006.01)
*G06T 17/20* (2006.01)
*G06T 19/20* (2011.01)

(52) U.S. Cl.
CPC .............. *G06T 15/04* (2013.01); *G06T 17/00* (2013.01); *G06T 17/205* (2013.01); *G06T 19/20* (2013.01); *G06T 2219/2021* (2013.01)

(58) Field of Classification Search
CPC ............................. G06T 15/04; G06T 15/08
See application file for complete search history.

(56) References Cited

U.S. PATENT DOCUMENTS

| 6,084,593 | A | * | 7/2000 | Gibson | ................... G06T 17/10 345/424 |
| 6,111,577 | A |  | 8/2000 | Zilles et al. | |
| 6,421,048 | B1 |  | 7/2002 | Shih et al. | |
| 6,867,770 | B2 |  | 3/2005 | Payne | |
| 6,958,752 | B2 |  | 10/2005 | Jennings, Jr. et al. | |
| 7,149,596 | B2 |  | 12/2006 | Berger et al. | |
| 7,626,589 | B2 |  | 12/2009 | Berger | |

(Continued)

OTHER PUBLICATIONS

3D Coat, Voxels>displacement map workflow ?, Nov. 5, 2009-May 26, 2010, http://3dcoat.com/forum/index.php?showtopic=4279, pp. 1-4.*

Catmull et al, Recursively generated B-spline surfaces on arbitrary topological meshes, Nov. 1978, IPC Business Press, vol. 10 No. 6, pp. 350-355.*

(Continued)

*Primary Examiner* — Maurice L McDowell, Jr.

(57) ABSTRACT

The present disclosure provides a system and method for the development and manipulation of three-dimensional voxel-based models. The method includes accessing, by a processor of a computing device, a subdivision surfacing geometry (SubD) model and converting a portion of features of the SubD model to a voxel model. The method includes accessing a texture for application to the voxel model and combining the texture and the voxel model to create a textured voxel model. The method includes determining displacement maps determined based in part on a difference between a surface portion of the voxel model and a surface portion of the SubD model and applying the displacement maps to the surface portion of the SubD model to determine a second SubD model where the second SubD model is configured for manipulation while preserving a visual aesthetic and a geometric placement of the added texture.

18 Claims, 18 Drawing Sheets

(56) References Cited

U.S. PATENT DOCUMENTS

| | | | |
|---|---|---|---|
| 7,889,209 | B2 | 2/2011 | Berger et al. |
| 8,174,535 | B2 | 5/2012 | Berger et al. |
| 2001/0038705 | A1 | 11/2001 | Rubbert et al. |
| 2004/0100465 | A1 | 5/2004 | Stowe et al. |
| 2005/0128210 | A1 | 6/2005 | Berger |
| 2005/0131660 | A1* | 6/2005 | Yadegar .............. G06T 9/001 703/2 |
| 2006/0066611 | A1* | 3/2006 | Fujiwara .............. G06T 15/06 345/419 |
| 2006/0109269 | A1 | 5/2006 | Jennings et al. |
| 2008/0246761 | A1* | 10/2008 | Faken .............. G06F 3/016 345/420 |
| 2008/0261165 | A1 | 10/2008 | Steingart et al. |
| 2009/0248184 | A1 | 10/2009 | Steingart et al. |
| 2010/0291505 | A1 | 11/2010 | Rawley et al. |
| 2011/0254839 | A1* | 10/2011 | Hammer .............. G06T 17/00 345/420 |
| 2012/0065755 | A1 | 3/2012 | Steingart et al. |
| 2012/0281873 | A1* | 11/2012 | Brown .............. G06T 19/006 382/103 |
| 2013/0009948 | A1 | 1/2013 | Berger et al. |
| 2013/0297059 | A1* | 11/2013 | Grifith .............. G06F 17/50 700/98 |

OTHER PUBLICATIONS

Dan Rickard Animation, SubD Modeling part1, Oct. 20, 2009, https://www.youtube.com/watch?v=leayTnldCV8, pp. 1.*

Jamie's Jewels, 73. 3ds Max Quicktip: Sub-object selection shortcut, Sep. 28, 2011, http://jamiesjewels.typepad.com/jamies_jewels/2011/09/73-3ds-max-quicktip-sub-object-selection-shortcut.html, pp. 1-2.*

Kaufman et al, Volume Graphics, Jul. 1993, IEEE, pp. 51-64.*

Lai et al, Voxelization of Free-Form Solids Represented by Catmull-Clark Subdivision Surfaces, 2006, Springer-Verlag Berlin, GMP'06: Lecture Notes in Computer Science, pp. 595-601.*

Sensable now part of Geomagic, Freeform® & Freeform Plus™ v2013 Quick Reference Card, 3 pages(Jan. 2013).

Sensable now part of Geomagic, Freeform® & Freeform Plus™ Organic Design Systems, Freeform & Freeform Plus Installation Guide, 26 pages (Jan. 2013).

Sensable now part of Geomagic, Freeform® & Freeform Plus™ Organic Design Systems, Freeform & Freeform Plus Tutorials, 246 pages (Jan. 2013).

Sensable now part of Geomagic, phantom® Haptic Devices, Phantom Device Driver Installation Guide, 18 pages (Oct. 1, 2012).

* cited by examiner

APPARATUS AND METHODS FOR DETAILING SUBDIVISION SURFACES

RELATED APPLICATIONS

This application claims priority to and the benefit of U.S. Provisional Patent Application No. 61/799,002 filed Mar. 15, 2013, the text of which is incorporated herein by reference in its entirety.

FIELD OF INVENTION

This invention relates generally to the rendering of virtual objects. More particularly, in certain embodiments, the invention relates to methods of adding surface detail on a model that can configured for manipulation while preserving at least one of a visual aesthetic and a geometric placement of the added surface detail.

BRIEF DESCRIPTION OF THE FIGURES

The foregoing and other objects, aspects, features, and advantages of the present disclosure will become more apparent and better understood by referring to the following description taken in conjunction with the accompanying drawings, in which.

Figure 1:
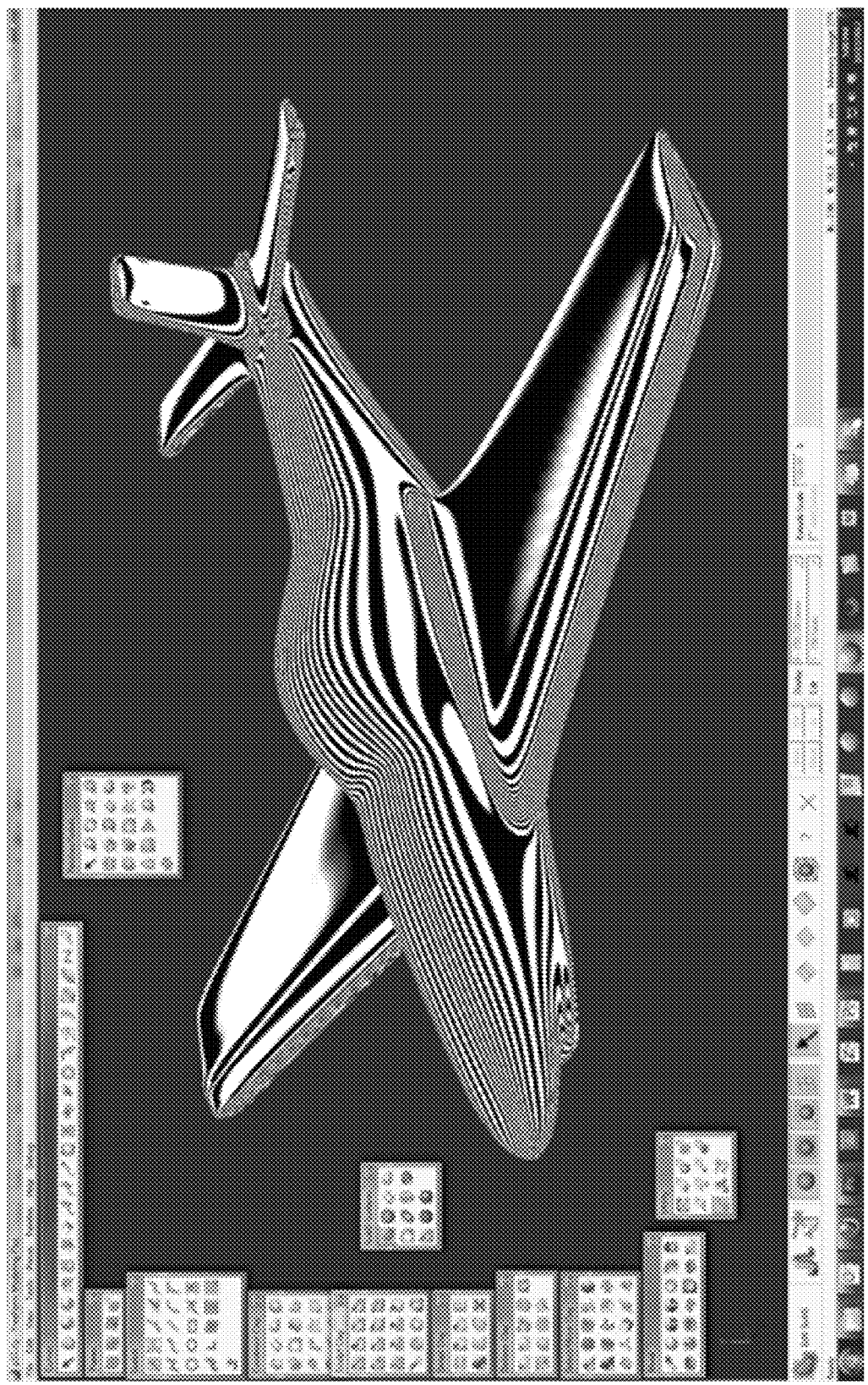
FIG. 1 is an illustration of an example of a subdivision surfacing geometry (SubD) model representation.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

This application incorporates herein by reference in their entireties, U.S. patent application Ser. No. 13/208,992, which was filed Aug. 12, 2011 and published as Publication No. 2012/0065755 on Mar. 15, 2012; U.S. application Ser. No. 13/465,507, filed on May 7, 2012 and published as Publication No. 2013/0009948 on Jan. 10, 2013; U.S. Pat. No. 8,174,535, entitled "Apparatus and Methods for Wrapping Texture Onto the Surface of a Virtual Object and issued May 8, 2012; U.S. Pat. No. 7,889,209, filed on Dec. 10, 2003, and U.S. Pat. No. 7,626,589 entitled "Haptic Graphical User Interface for Adjusting Mapped Texture" and issued Dec. 1, 2009.

It is contemplated that devices, systems, methods, and processes of the present disclosure encompass variations and adaptations developed using information from the embodiments described herein. Adaptation and/or modification of the devices, systems, methods, and processes described herein may be performed by those of ordinary skill in the relevant art.

Throughout the description, where apparatus and systems are described as having, including, or comprising specific components, or where processes and methods are described as having, including, or comprising specific steps, it is contemplated that, additionally, there are apparatus, and systems of the disclosed technology that consist essentially of, or consist of, the recited components, and that there are processes and methods according to the disclosed technology that consist essentially of, or consist of, the recited processing steps.

In one aspect, the present disclosure relates to the development and manipulation of three-dimensional voxel-based models. By assigning one or more values to each voxel in the model that is reflective of physical properties that vary throughout the volume to be produced, it is much easier to produce high quality, aesthetically acceptable, nonhomogeneous objects. For example, the object shape may be first defined in voxels, then a texture map applied to define the first portion of the object by tagging the appropriate voxels, with the remaining untagged voxels defined as a second portion of the object. Further, a voxel representation lends itself to a more accurate, simpler, direct interface of model data with printer output. As an illustrative example, for stereo lithography (STL) based output systems, the STL file is scan-converted to produce pixels at the printer's native resolution (dpi or dots per inch) one level at a time, thereby defining each successive Z-layer. However, voxels lend themselves to a more efficient, more direct interface with a printer. For example, the shape and desired material properties of each successive Z-layer (depth layer) of the object to be manufactured can be defined by simple tagging of voxels. Values of one or more physical properties (e.g. color, translucency, hardness, elasticity, etc.) are then assigned for each voxel.

Volumetric voxel model representations readily maintain a watertight model without holes or self-intersections. Such representations naturally support Boolean operations based on a voxel-by-voxel compositing process. A voxel is a volume element. In order to perform the methods described in the present disclosure, in some implementations, an initial model is created. This model comes from various sources including scans of physical objects or prior interactive editing. The voxel model, or an alternative initial model, is represented by numerical values maintained in computer memory in an array. Also, voxel representations lend themselves to efficient processing, e.g., performance of multivariate (e.g., trilinear) interpolation to drive the printer output on demand and at the proper resolution.

In some implementations, the system includes a Subdivision Surfacing geometry (SubD) model representation type to complement the voxel, mesh and NURBS geometry representations. SubD surfaces, in some implementations, provide, for example: faster modeling for certain forms; better surface quality for smooth surfaces; light weight (e.g., For example, as shown in FIG. 1, the airplane geometry can be represented in 158,000 polygons vs. 5.6 million polygons for the same level of smoothness); automatic conversion to NURBS; easy workflow integration with existing voxel models; and integration with displacement maps for advanced texture embossing In some implementations, subdivision surfaces are defined recursively from a standard piecewise linear polygonal mesh. The starting polygonal mesh is often called a "cage". In some implementations, a refinement scheme is applied to the cage that subdivides the original vertices, edges and faces with the net effect of creating new additional vertices, edges and faces. The positions of the new mesh vertices, in some implementations, are computed based on the original cage vertex positions. This collection of new vertex positions and faces can be thought of as a new "cage" and subdivided again and again a pre-determined number of times.

Figure 2A:
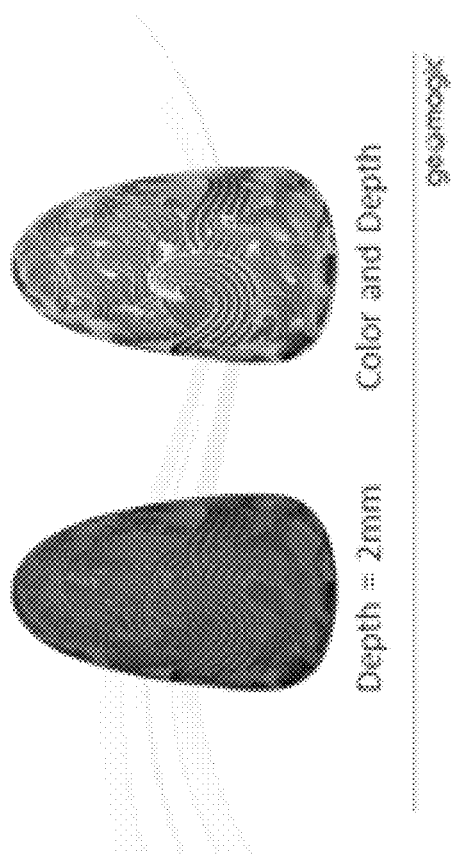
FIGS. 2A and 2B are illustrations of examples of texture and displacement mapping of SubD modeling.
Figure 2B:
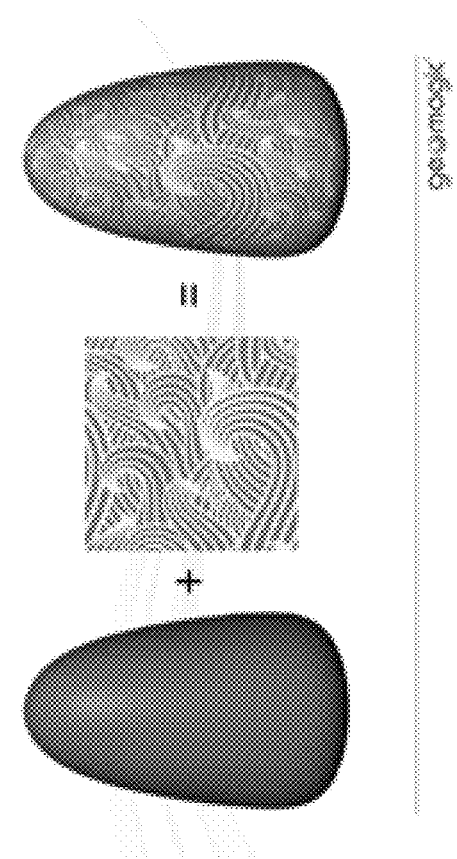

In some implementations, SubD modeling supports both texture mapping and displacement mapping as shown in FIGS. 2A and 2B. An image can be applied (for example, via a (U,V) coordinate texture mapping function) to a surface of a SubD representation and the resulting color of the mapped image can be used to represent the color of the surface at that location, or can represent a (height) displacement from the surface, or both. In some implementations, (U,V) coordinates are used in a two-dimensional texture coordinate system that may be used to map a surface. A texture may be mapped to a surface using the (U,V) coordinate system to facilitate the placement of the texture on the surface. The (U,V) coordinate system may be used to identify specific points of the surface onto which a texture may be mapped.

In some implementations, images for displacement maps can be derived from the grayscale version of photographs where the black areas are mapped to be low points and the light areas the high points relative to the original geometry. In some implementations, the system uniquely combines aspects of Voxel modeling along with SubD modeling to provide a novel Texture Capture workflow that allows the user to easily define new, custom texture details.

Texture Capture

Figure 3:
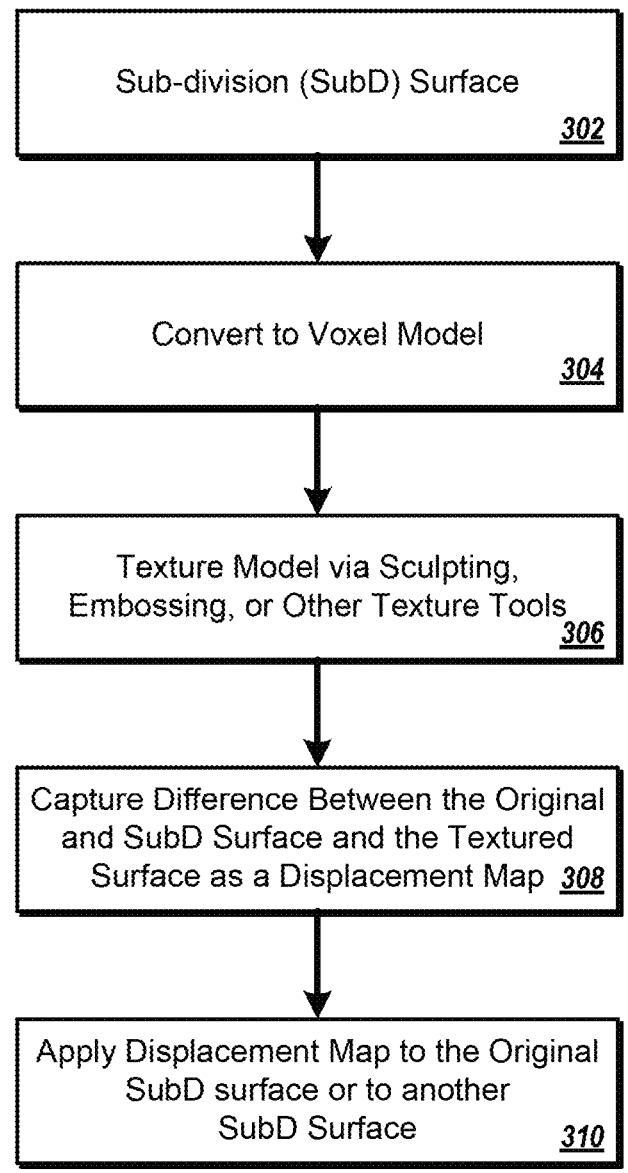
FIG. 3 is a flowchart of an example method for capturing texture.

FIG. 3 is a flow chart of a method 300 for capturing texture. In some implementations, the method 300 includes receiving a SubD model and/or surface (302). In some implementations, the method includes converting the SubD model and/or surface to a Voxel model (304). In some implementations, the method 300 includes texturing the model (306) via, for example, sculpting, embossing, or using other texturing tools to determine a textured surface. In some implementations, the method 300 includes capturing the difference between the original and SubD surface and the textured surface as one or more displacement maps (308). In some implementations, the method 300 includes applying a displacement map to the original SubD model and/or surface or to another SubD surface and/or model (310).

Figure 4:
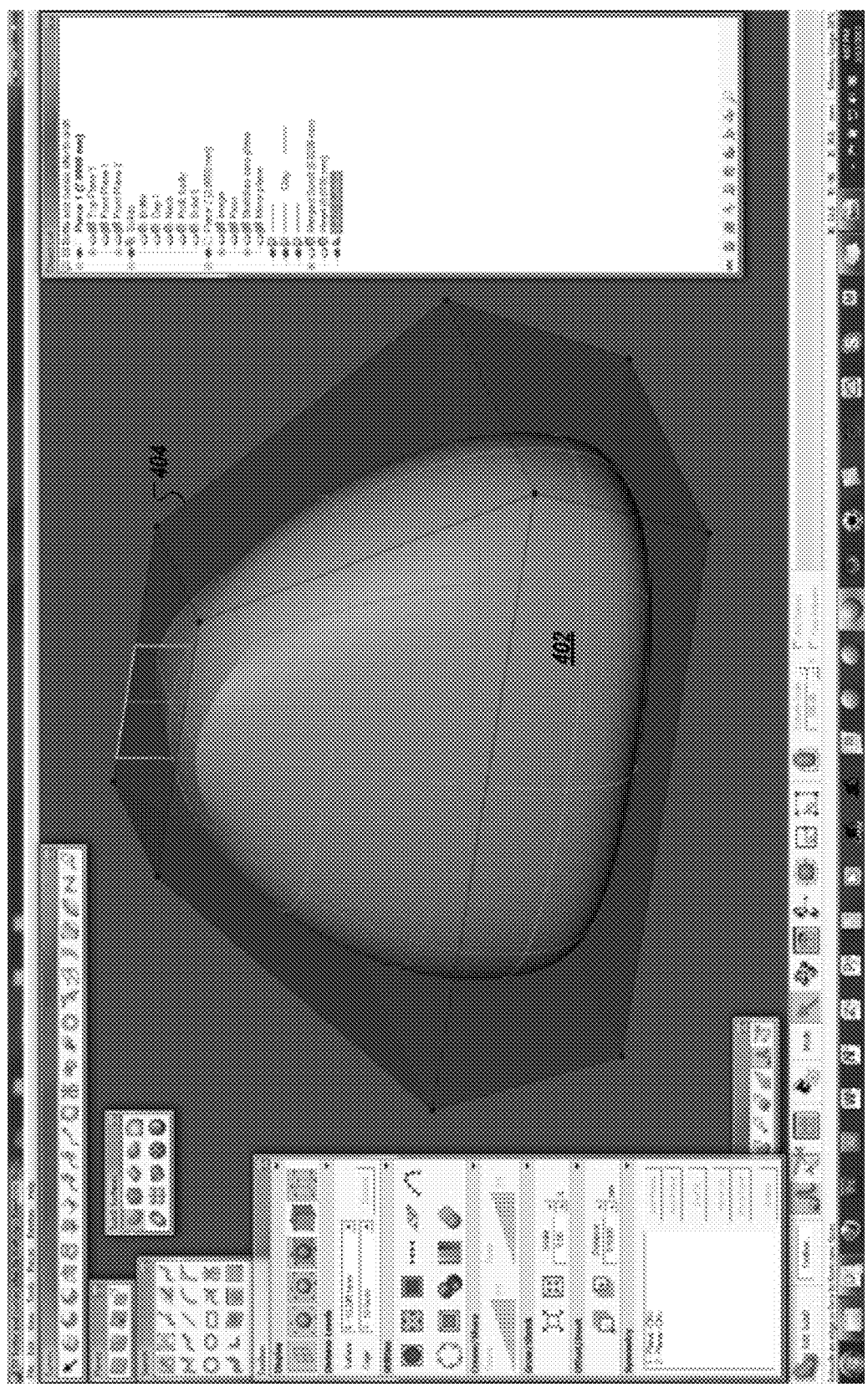
FIG. 4 is an illustration of an example defining a cage for a SubD model.

In some implementations, as shown in FIG. 4, given the SubD model 402 of, for example, a perfume bottle, a defining cage 404 can be defined, having vertices, edges and faces surrounding a surface of the SubD model 402. In this example, the ten faces of the defining cage 404 are subdivided into over 10,000 faces for the sub-division surface.

Figure 5:
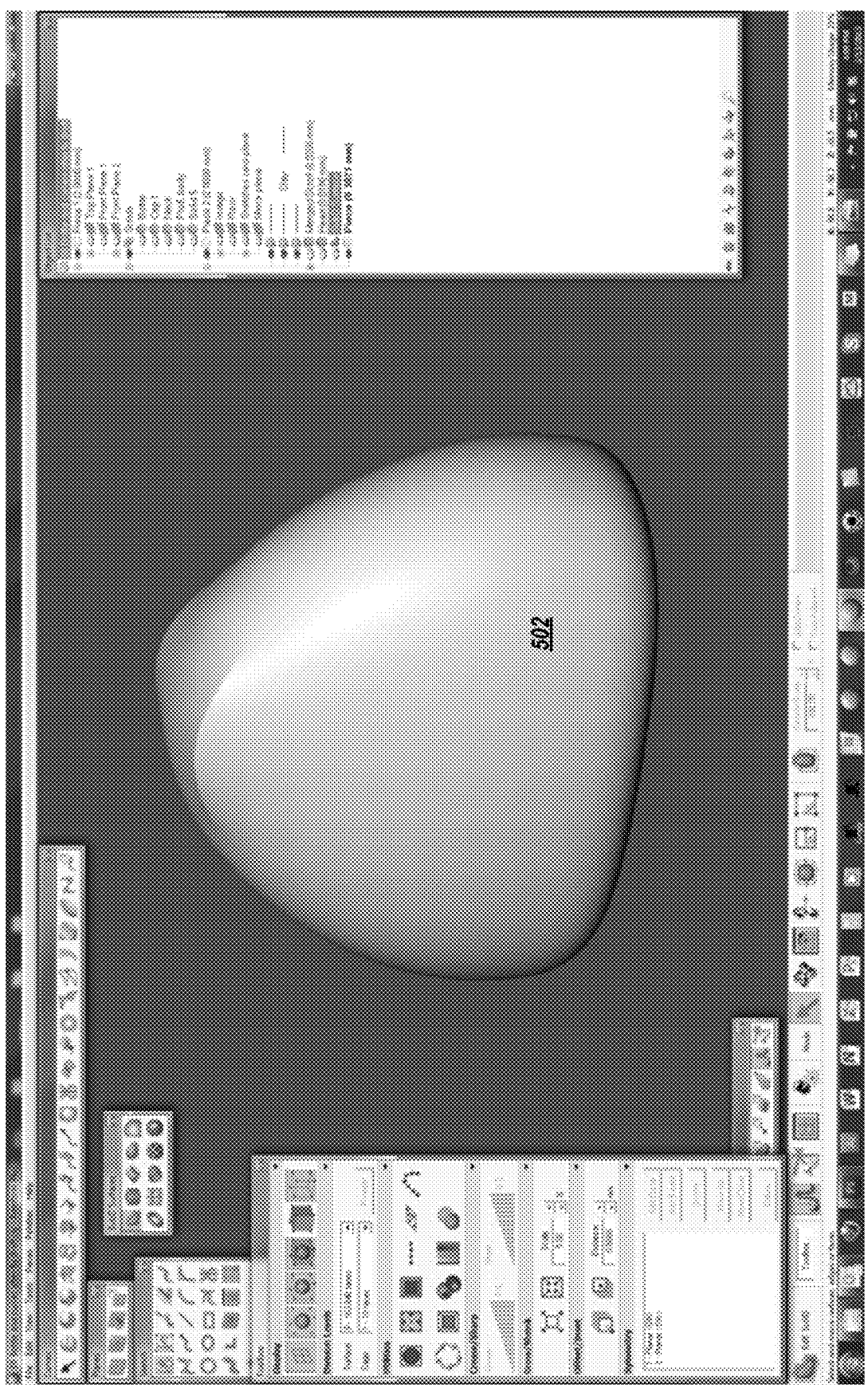
FIG. 5 is an illustration of voxel model converted from a SubD model.

In some implementations, the SubD model 402 is now converted to a corresponding voxel model 502 as shown in FIG. 5. In some implementations, the user is presented the opportunity to specify the voxel resolution. In some implementations, the conversion of the SubD model 402 to the voxel model 502 proceeds automatically (e.g., based upon a default resolution, the resolution of a known system printer, etc.).

Figure 6:
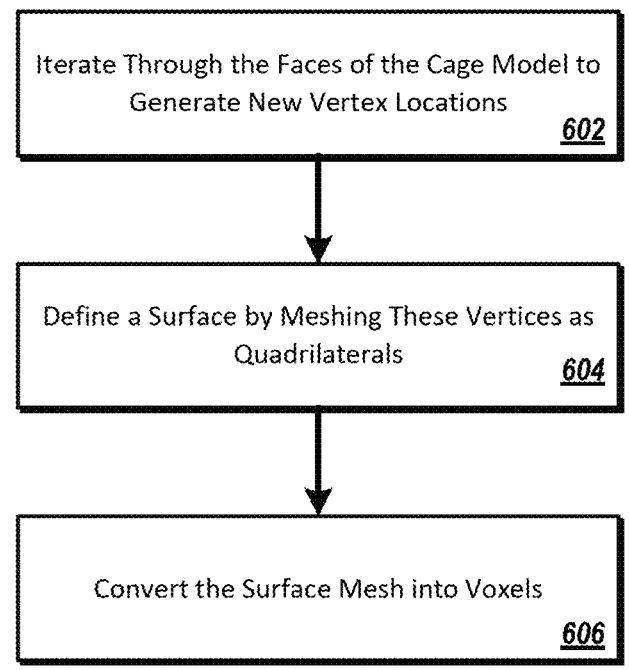
FIG. 6 is a flowchart of an example method for converting a SubD model to a voxel model.

FIG. 6 is an illustration of an example method 600 for converting a SubD model to a voxel model. In some implementations, the conversion method 600 includes: iterating through the faces of the cage representation of the SubD model to generate the new vertex locations (602); defining a surface by meshing these vertices of the cage model as quadrilaterals (604); then converting for a corresponding voxel model the resultant surface mesh representation into voxels (606).

Figure 7A:
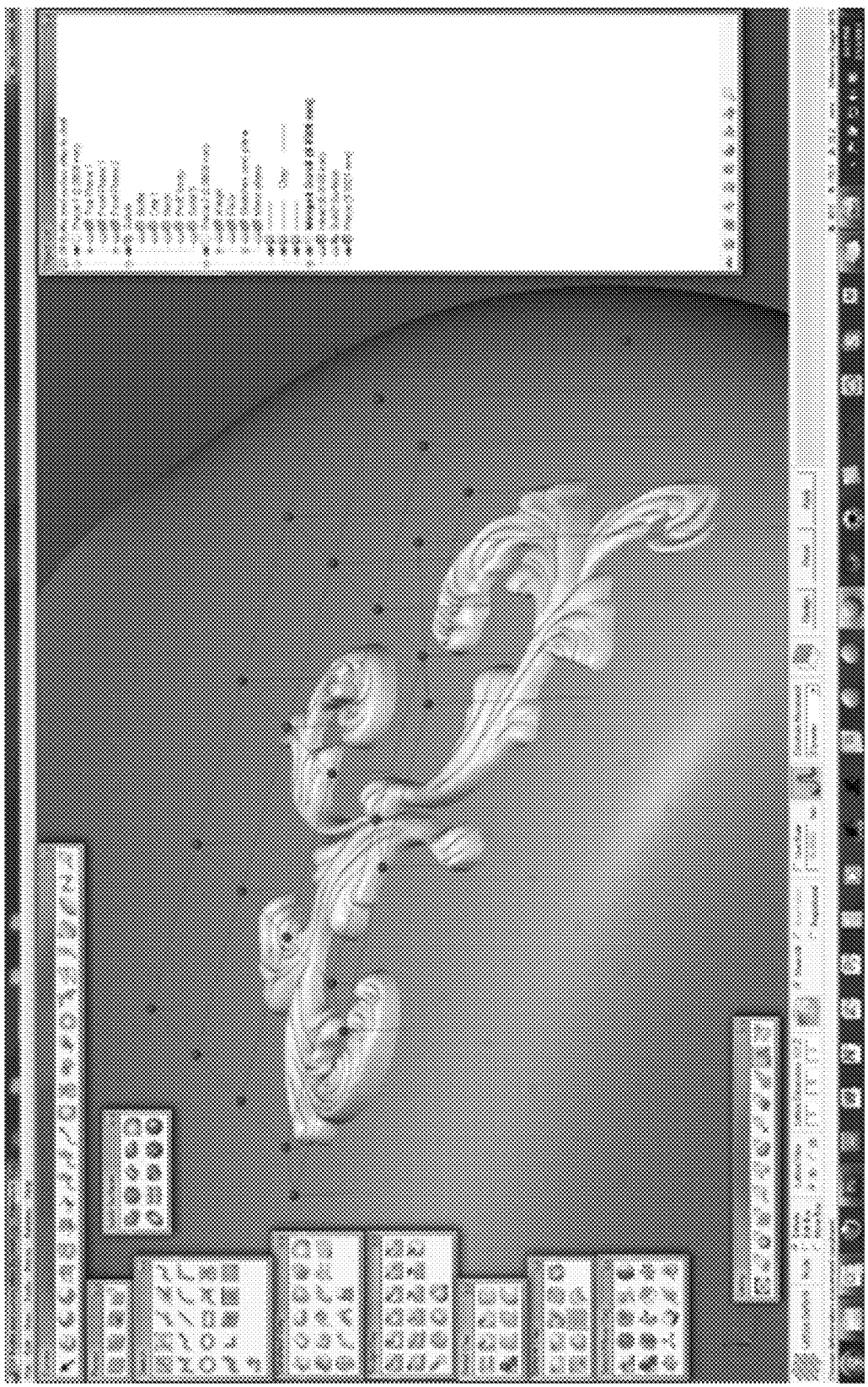
FIGS. 7A and 7B are illustrations of a texture added to a voxel model.
Figure 7B:
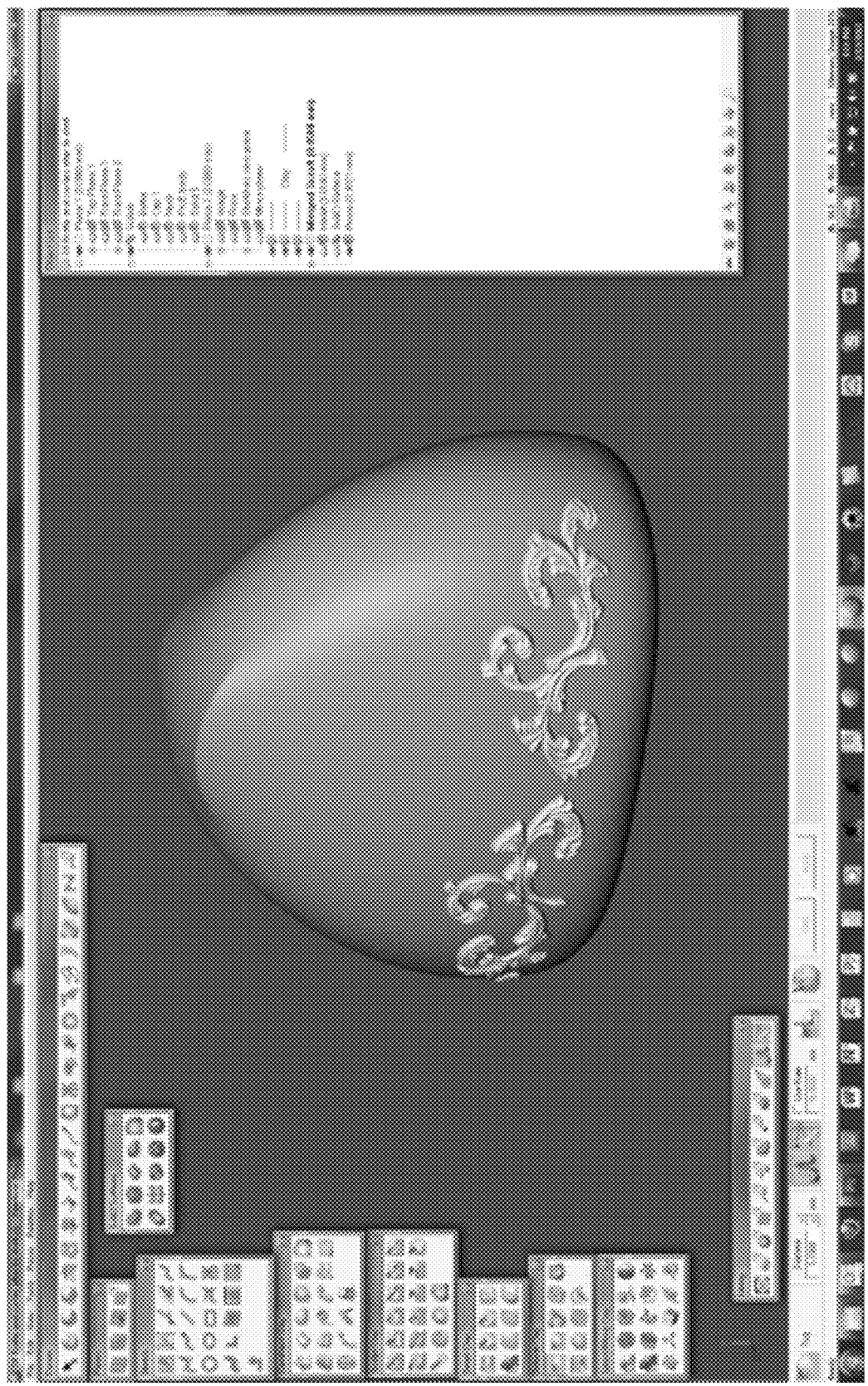

In some implementations, surface detail elements are added to the Voxel model. In some implementations, the surface detail elements are added to the Voxel model using the multi-purpose 3D sculpting design platform sold under the trademark FREEFORM, and its standard suite of design tools. For example, as shown in FIGS. 7A and 7B, a "filigree" shape has been captured with a 3d scanning system and is applied to the Voxel version of the perfume bottle. The height and location are adjusted to show the filigree to best advantage.

Figure 8:
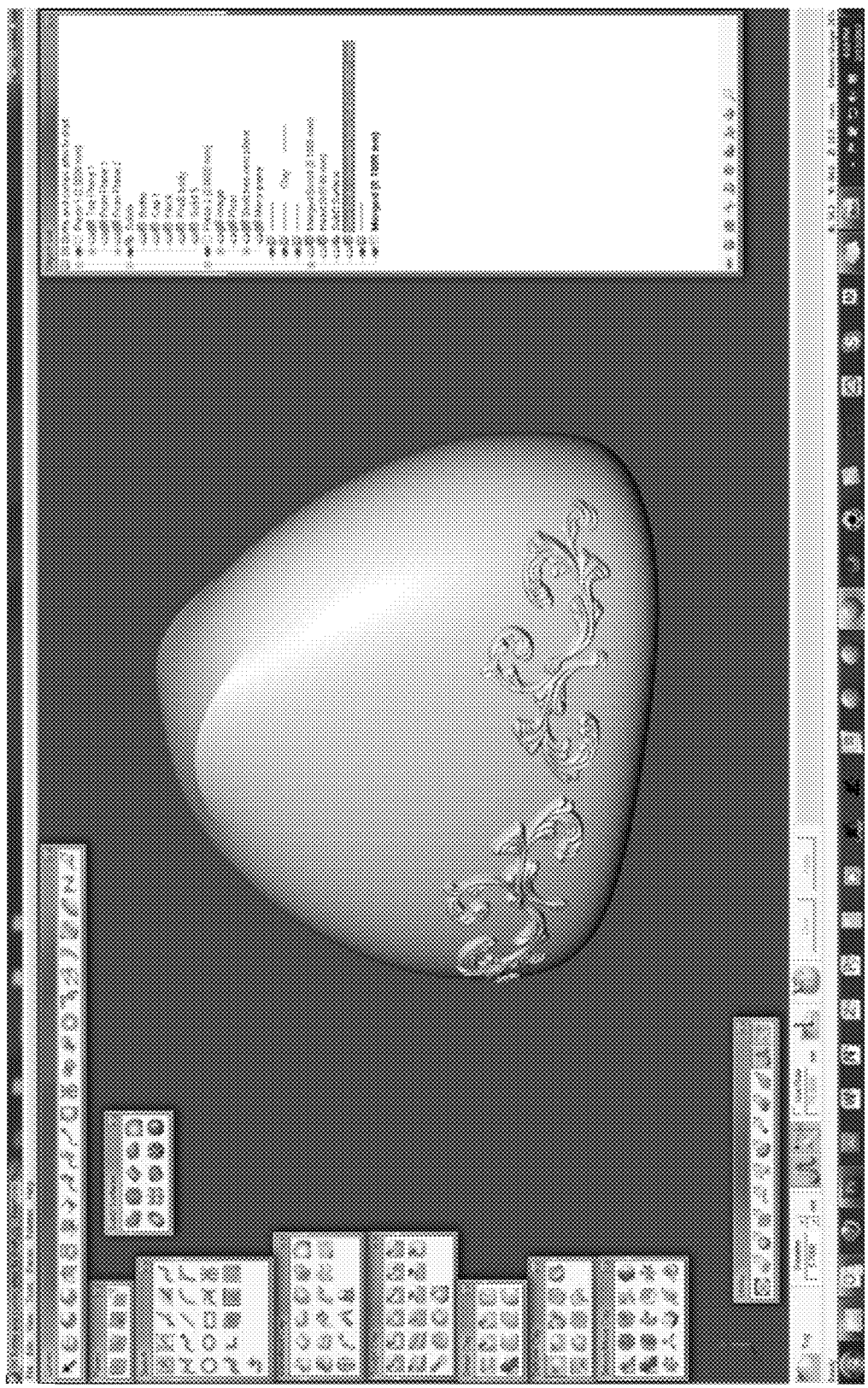
FIG. 8 is an illustration of a single voxel model combined from two voxel models.

In some implementations, the Voxel models for the perfume bottle and filigree are combined into a single Voxel model for the next step. In some implementations, after the design adjustments have been made, the Voxel models for the perfume bottle and filigree are combined into a single Voxel model for the next step as shown in FIG. 8.

Figure 9A:
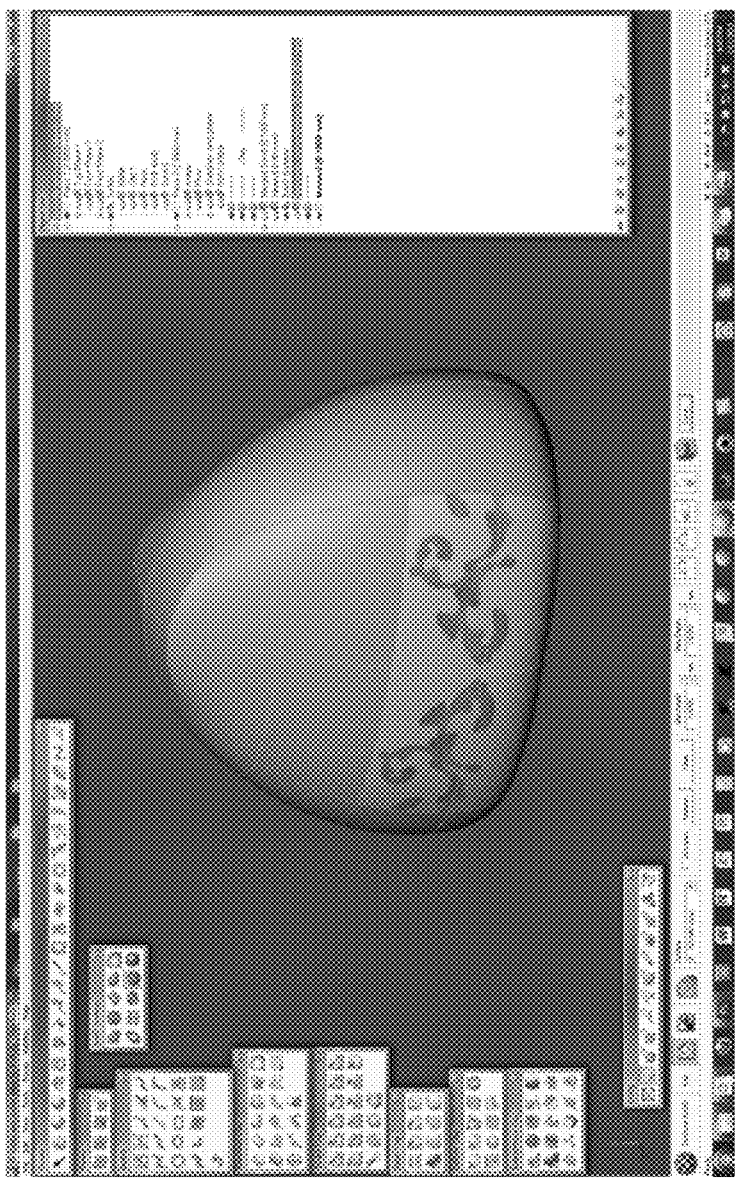
FIGS. 9A and 9B are illustrations of the difference between the voxel surface and the SubD surface captured as displacement maps and reapplied to the SubD model.
Figure 9A:
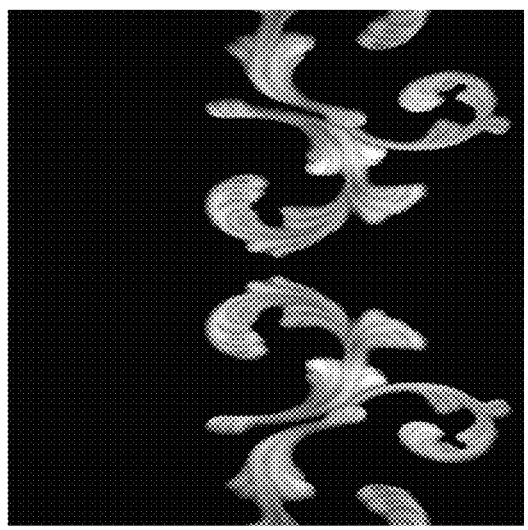
Figure 9B:
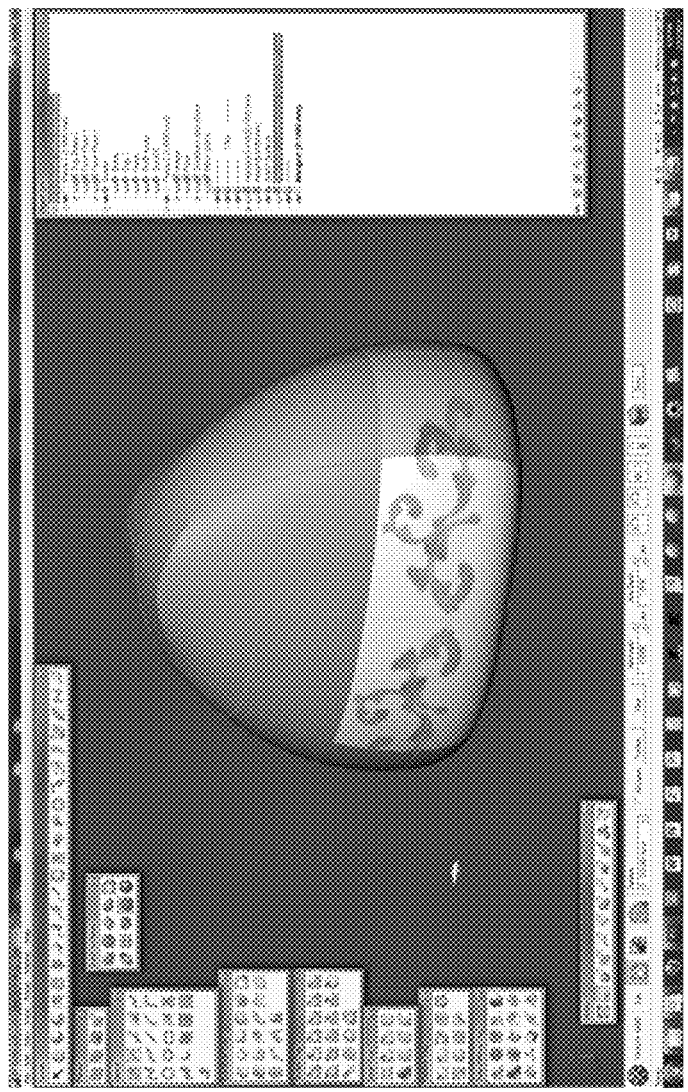
Figure 9B:
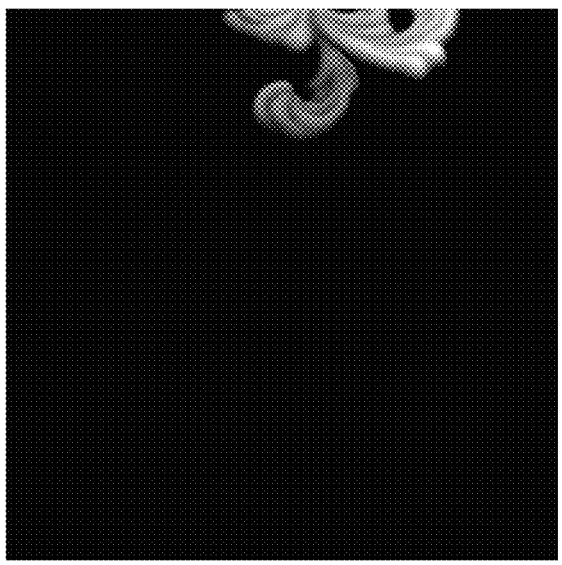

In some implementations, the difference between the Voxel surface and the SubD surface is captured as displacement maps and reapplied as textures to the SubD model as shown in FIGS. 9A and 9B. In some implementations, the difference between the Voxel surface and the SubD surface is captured as displacement maps and reapplied as textures to the SubD model occurs after the Voxel models for the, for example, perfume bottle and filigree are combined into a single Voxel model.

In some implementations, the difference between the front face of the Voxel surface and the SubD surface is captured as displacement maps and reapplied as textures to the SubD model as shown in FIG. 9A. In some implementations, the difference between the side faces of the Voxel surface and the SubD surface is captured as displacement maps and reapplied as textures to the SubD model as shown in FIG. 9B.

In some implementations, other faces of the Voxel surface and the SubD surface are captured as displacement maps and reapplied as textures to the SubD model. In some implementations, all faces of Voxel surface and the SubD surface are captured as displacement maps and reapplied as textures to the SubD model. In some implementations, each face Voxel surface and the SubD surface is captured independently as a displacement map and reapplied as a texture to the SubD model.

Figure 10:
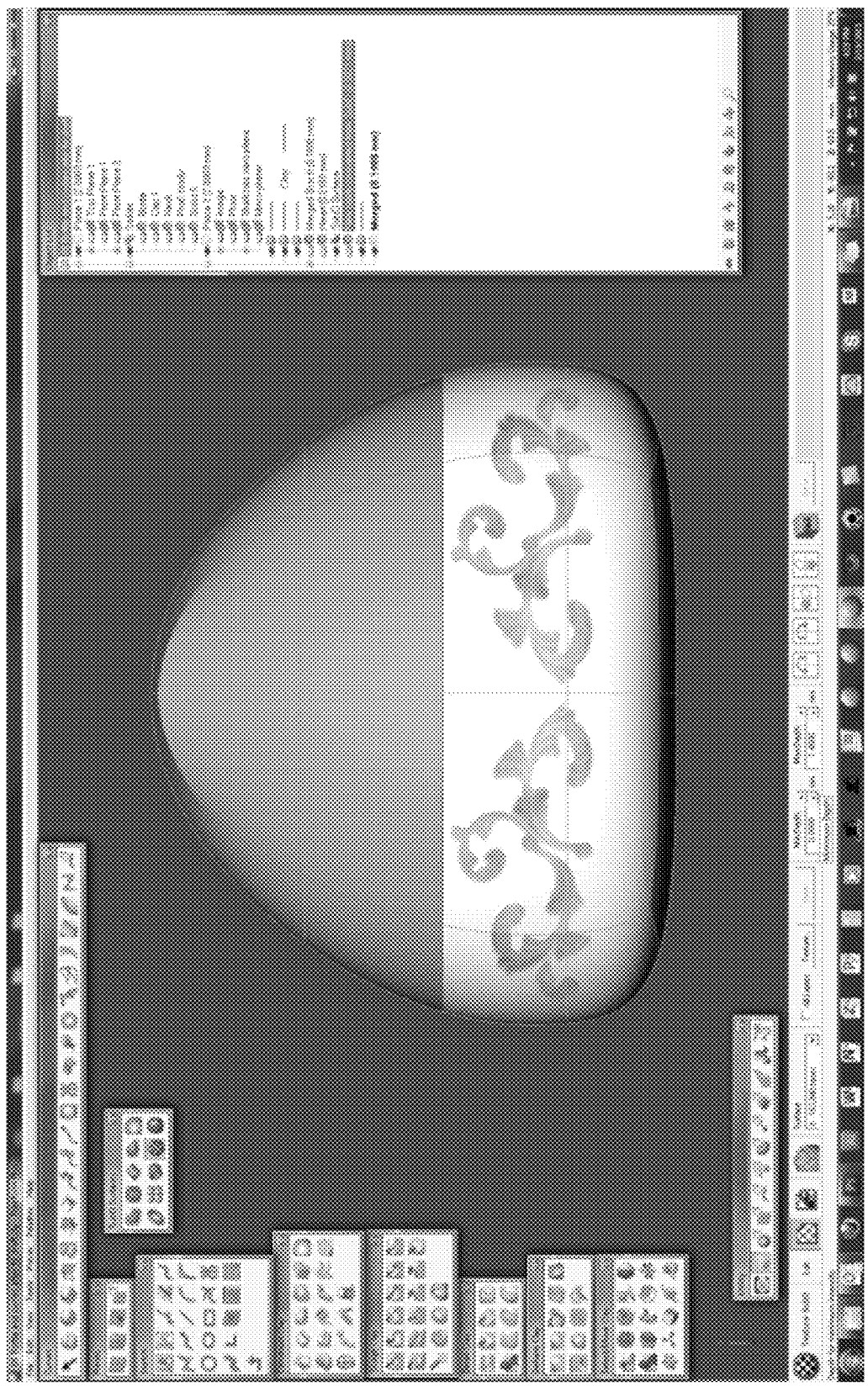
FIG. 10 is an illustration of a displacement map that captures the desired detail from the voxel surface.

In some implementations, as shown in FIG. 10, a displacement map (or series of displacement maps) is produced that fully captures the desired detail from the Voxel surface.

Figure 11:
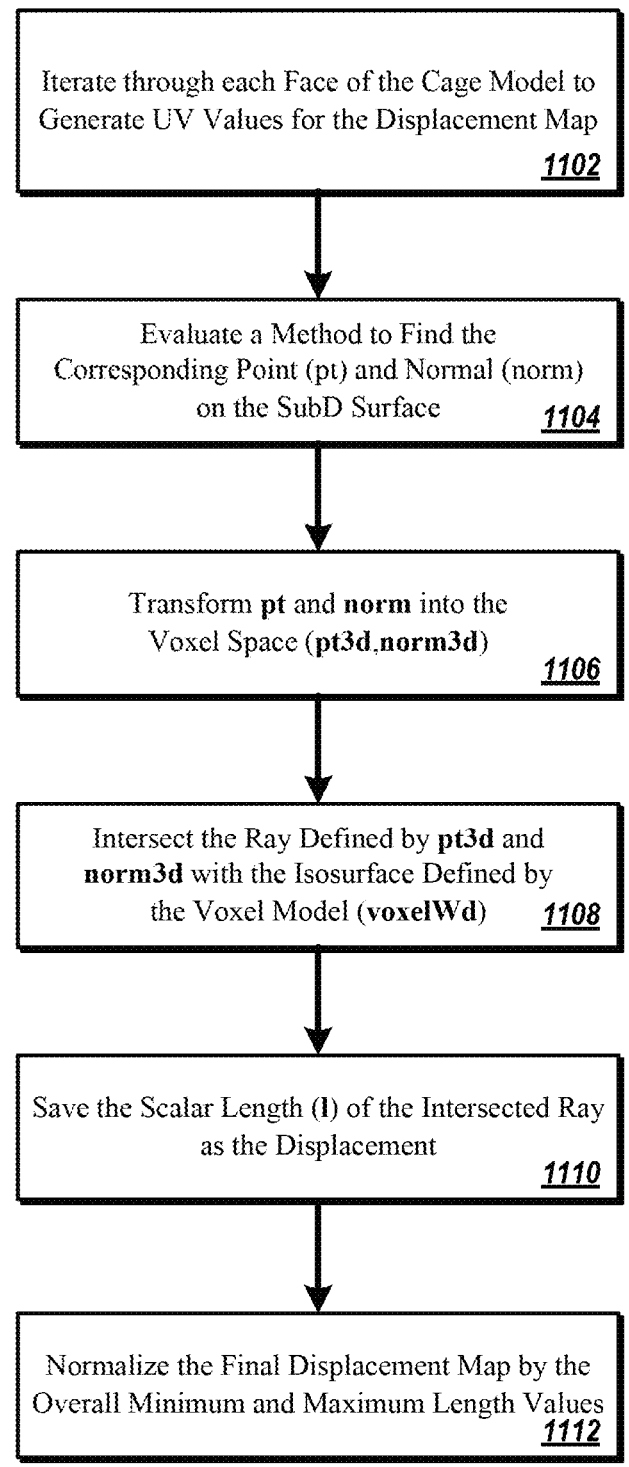
FIG. 11 is a flowchart of an example method for calculating displacement maps.

In some implementations, the basic method for calculating the displacement maps is similar to that used to generate the voxel model. FIG. 11 is a flowchart of an example method 1100 for calculating displacement maps. In some implementations, the method 1100 includes the steps of: iterate through the face of the cage model to generate UV values for the displacement map (1102); using the UV, evaluate a method to find the corresponding point (pt) and normal (norm) on the SubD surface (1104); transform pt and norm into the voxel space (pt3d,norm3d) (1106); intersect the vector defined by pt3d and norm3d with the isosurface defined by the voxel model (voxelWd) (1108); save the scalar length (l) of the intersected vector as the displacement (1110); then normalize the final displacement map by the overall minimum and maximum length values (1112).

For example, the method may be performed as described below.

```
m_maxHeight = getPrefEntry<double>
   (_T("TextureCaptureMaxHeight"));
m_maxHeight = clamp(m_maxHeight, 1, 1000);
Workspace* pWs = getActiveWorkspace( );
double minHit = 1.0e20;
double maxHit = -1.0e20;
WorkspaceData* voxelWd = pWs->workspaceData( );
gstTransformMatrix wsXfrm = pWs->getTransformMatrix( );
gstTransformMatrix wsXfrmInv = wsXfrm.getInverse( );
double u0 = 0;
double v0 = 0;
double u1 = 1;
double v1 = 1;
bool hitClay = false;
for (int y = 0; y < m_height; y++) {
   double v = v0 + (v1 - v0) * y / (m_height - 1.0);
   for (int x = 0; x < m_width; x++) {
      double u = u0 + (u1 - u0) * x / (m_width - 1.0);
      Point3Df pt;
      Vector3Df norm;
      m_surfEval.eval(u,v, pt, norm);
      Point3Df pt3d = (pt + m_maxHeight * norm) * wsXfrmInv;
      Vector3Df norm3d = -norm * wsXfrmInv;
      norm3d.normalize( );
      bool findIsosurface = true;
      Point3Df ptOut;
      if (RAYCASTING::intersectRayWithWorkspaceData
         (voxelWd, pt3d, norm3d,
DBL_MAX, ptOut, findIsosurface)) {
         Point3Df clayPt = ptOut * wsXfrm;
         Vector3Df v = clayPt - pt;
         double l = v.dot(norm);
         int idx = y * m_width + x;
         m_disp[idx] = l;
         if (l < minHit)
            minHit = l;
         if (l > maxHit)
            maxHit = l;
         hitClay = true;
      }
   }
}
```

Figure 12:
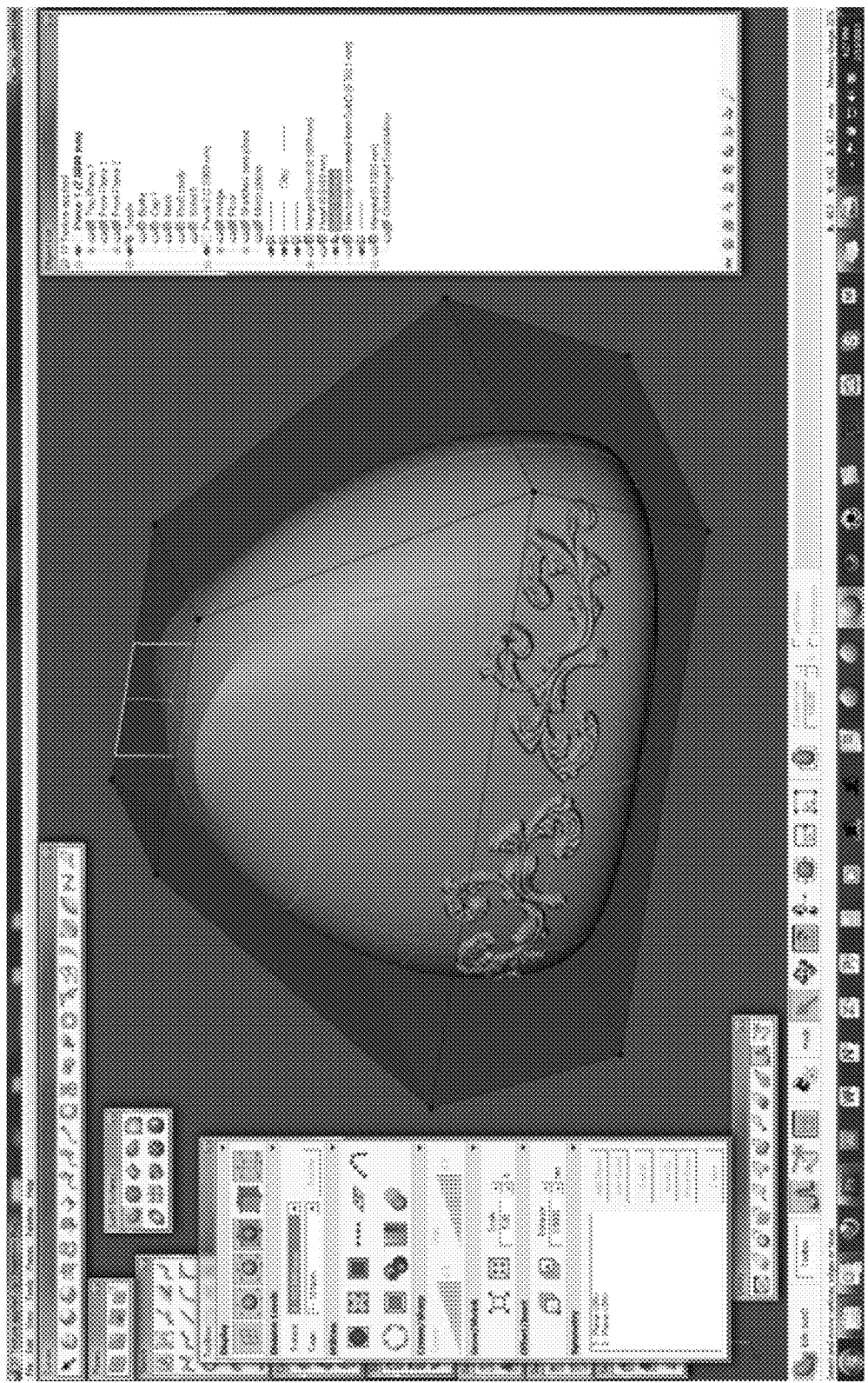
FIG. 12 is an illustration of an example surface with 160,000 faces.
Figure 13:
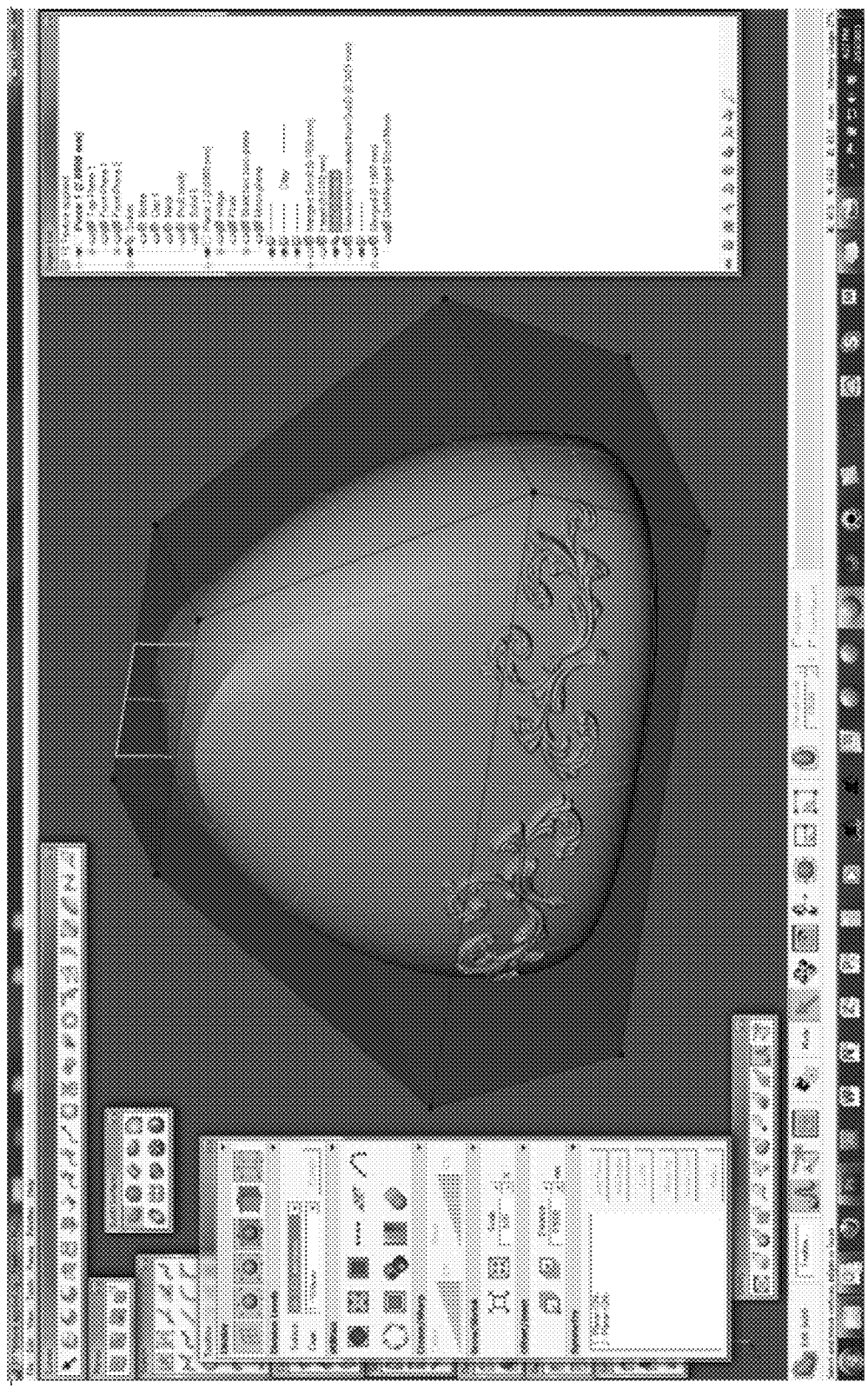
FIG. 13 is an illustration of an example surface with over 2 million faces.

In some implementations, the displacement maps to the SubD surface. The detail from the displacement map may require a deeper sub-division level so that the design looks good. As shown in FIG. 12, the surface is shown, for example, with 160,000 faces. In another example, as shown in FIG. 13, the surface is shown with over 2 million faces.

Figure 14:
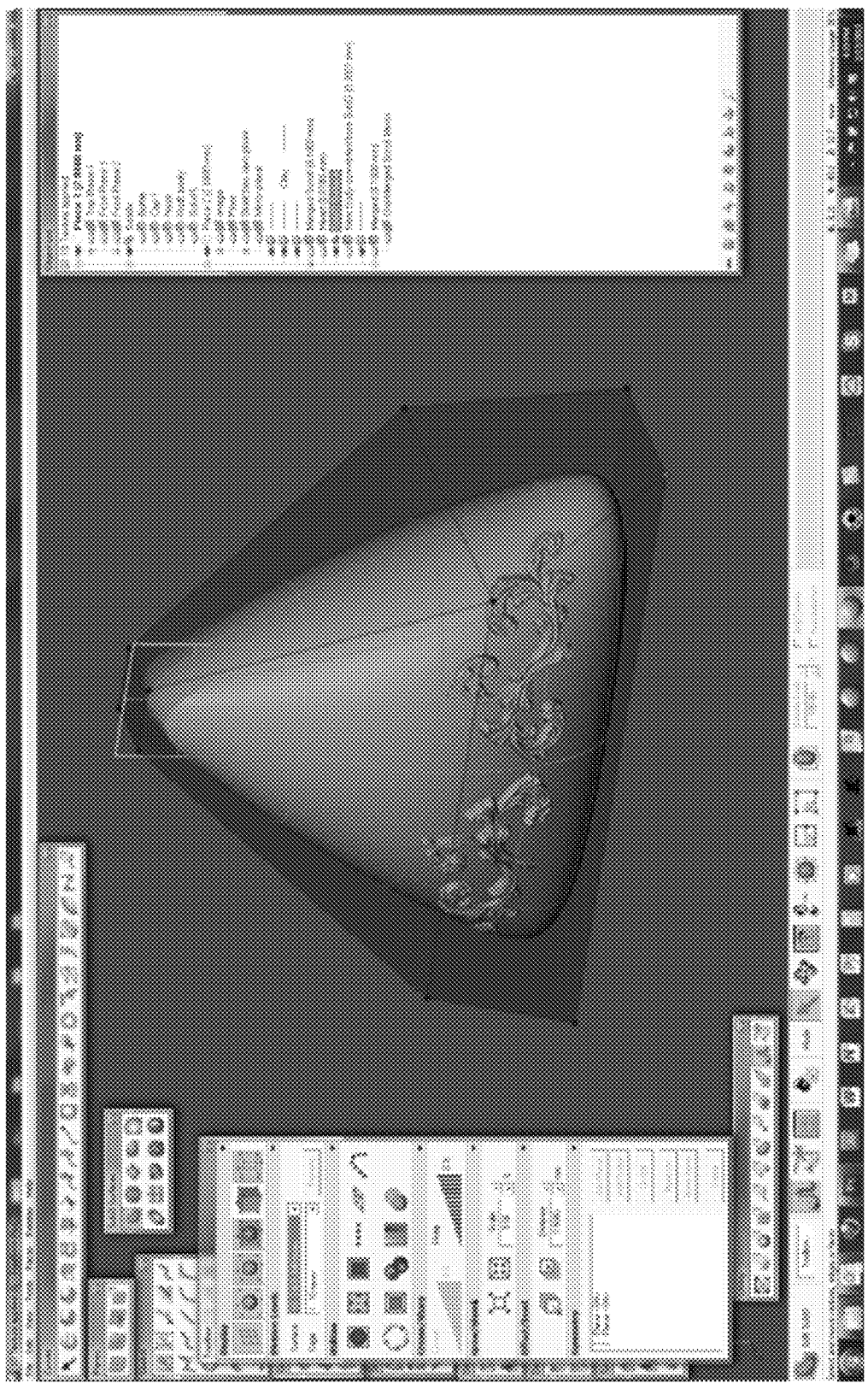
FIG. 14 is an illustration of an example surface manipulated while preserving the visual aesthetic and/or geometric placement of the added texture.

In some implementations, the benefit of applying the displacement map to the SubD surface can be seen relative to the original Voxel model of the, for example, perfume bottle and filigree. With the new SubD surface, the overall shape can be controlled via manipulating the vertices and edges of the polygonal "cage". In some implementations, if we want to make, for example, a "pinched" version of the bottle this is a simple operation and preserves the look and placement of the embossed filigree pattern as shown in FIG. 14.

Figure 15:
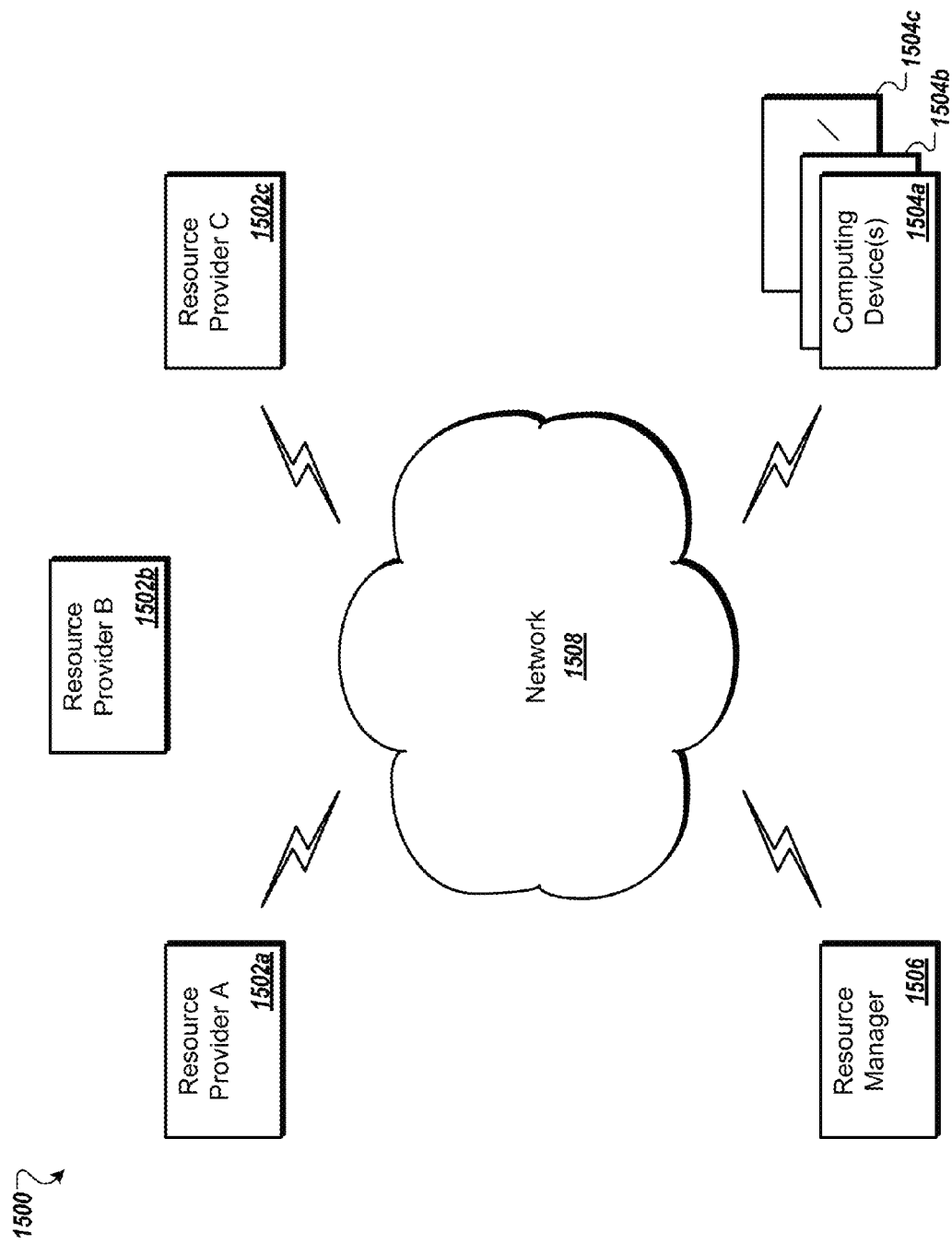
FIG. 15 shows a block diagram of an exemplary cloud computing environment.

As shown in FIG. 15, an implementation of a network environment 1500 for use in detailing subdivision surfaces is shown and described. In brief overview, referring now to FIG. 15, a block diagram of an exemplary cloud computing environment 1500 is shown and described. The cloud computing environment 1500 may include one or more resource providers 1502a, 1502b, 1502c (collectively, 1502). Each resource provider 1502 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 1502 may be connected to any other resource provider 1502 in the cloud computing environment 1500. In some implementations, the resource providers 1502 may be connected over a computer network 1508. Each resource provider 1502 may be connected to one or more computing device 1504a, 1504b, 1504c (collectively, 1504), over the computer network 1508.

The cloud computing environment 1500 may include a resource manager 1506. The resource manager 1506 may be connected to the resource providers 1502 and the computing devices 1504 over the computer network 1508. In some implementations, the resource manager 1506 may facilitate the provision of computing resources by one or more resource providers 1502 to one or more computing devices 1504. The resource manager 1506 may receive a request for a computing resource from a particular computing device 1504. The resource manager 1506 may identify one or more resource providers 1502 capable of providing the computing resource requested by the computing device 1504. The resource manager 1506 may select a resource provider 1502 to provide the computing resource. The resource manager 1506 may facilitate a connection between the resource provider 1502 and a particular computing device 1504. In some implementations, the resource manager 1506 may establish a connection between a particular resource provider 1502 and a particular computing device 1504. In some implementations, the resource manager 1506 may redirect a particular computing device 1504 to a particular resource provider 1502 with the requested computing resource.

Figure 16:
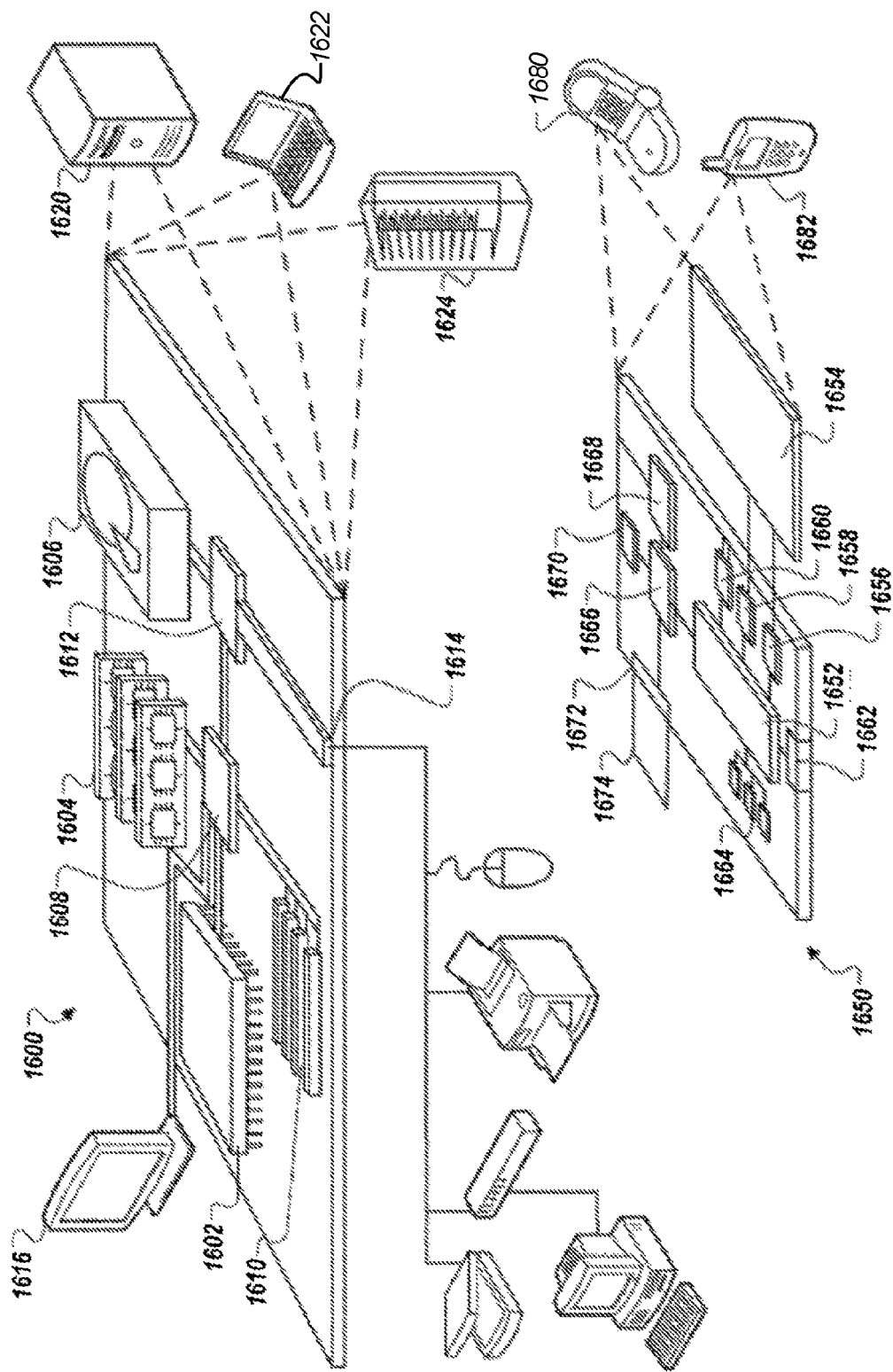
FIG. 16 is a block diagram of a computing device and a mobile computing device.

FIG. 16 shows an example of a computing device 1600 and a mobile computing device 1650 that can be used to implement the techniques described in this disclosure. The computing device 1600 is intended to represent various forms of digital computers, such as laptops, desktops, workstations, personal digital assistants, servers, blade servers, mainframes, and other appropriate computers. The mobile computing device 1650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 1600 includes a processor 1602, a memory 1604, a storage device 1606, a high-speed interface 1608 connecting to the memory 1604 and multiple high-speed expansion ports 1610, and a low-speed interface 1612 connecting to a low-speed expansion port 1614 and the storage device 1606. Each of the processor 1602, the memory 1604, the storage device 1606, the high-speed interface 1608, the high-speed expansion ports 1610, and the low-speed interface 1612, are interconnected using various busses, and may be mounted on a common motherboard or in other manners as appropriate. The processor 1602 can process instructions for execution within the computing device 1600, including instructions stored in the memory 1604 or on the storage device 1606 to display graphical information for a GUI on an external input/output device, such as a display 1616 coupled to the high-speed interface 1608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 1604 stores information within the computing device 1600. In some implementations, the memory 1604 is a volatile memory unit or units. In some implementations, the memory 1604 is a non-volatile memory unit or units. The memory 1604 may also be another form of computer-readable medium, such as a magnetic or optical disk.

The storage device 1606 is capable of providing mass storage for the computing device 1600. In some implementations, the storage device 1606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1602), perform one or more methods, such as those described above. The instructions can also be stored by one or more storage devices such as computer- or machine-readable mediums (for example, the memory 1604, the storage device 1606, or memory on the processor 1602).

The high-speed interface 1608 manages bandwidth-intensive operations for the computing device 1600, while the low-speed interface 1612 manages lower bandwidth-intensive operations. Such allocation of functions is an example only. In some implementations, the high-speed interface 1608 is coupled to the memory 1604, the display 1616 (e.g., through a graphics processor or accelerator), and to the high-speed expansion ports 1610, which may accept various expansion cards (not shown). In the implementation, the low-speed interface 1612 is coupled to the storage device 1606 and the low-speed expansion port 1614. The low-speed expansion port 1614, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 1600 may be implemented in a number of different forms, as shown in the figure. For example, it may be implemented as a standard server 1620, or multiple times in a group of such servers. In addition, it may be implemented in a personal computer such as a laptop computer 1622. It may also be implemented as part of a rack server system 1624. Alternatively, components from the computing device 1600 may be combined with other components in a mobile device (not shown), such as a mobile computing device 1650. Each of such devices may contain one or more of the computing device 1600 and the mobile computing device 1650, and an entire system may be made up of multiple computing devices communicating with each other.

The mobile computing device 1650 includes a processor 1652, a memory 1664, an input/output device such as a display 1654, a communication interface 1666, and a transceiver 1668, among other components. The mobile computing device 1650 may also be provided with a storage device, such as a micro-drive or other device, to provide additional storage. Each of the processor 1652, the memory 1664, the display 1654, the communication interface 1666, and the transceiver 1668, are interconnected using various buses, and several of the components may be mounted on a common motherboard or in other manners as appropriate.

The processor 1652 can execute instructions within the mobile computing device 1650, including instructions stored in the memory 1664. The processor 1652 may be implemented as a chipset of chips that include separate and multiple analog and digital processors. The processor 1652 may provide, for example, for coordination of the other components of the mobile computing device 1650, such as control of user interfaces, applications run by the mobile computing device 1650, and wireless communication by the mobile computing device 1650.

The processor 1652 may communicate with a user through a control interface 1658 and a display interface 1656 coupled to the display 1654. The display 1654 may be, for example, a TFT (Thin-Film-Transistor Liquid Crystal Display) display or an OLED (Organic Light Emitting Diode) display, or other appropriate display technology. The display interface 1656 may comprise appropriate circuitry for driving the display 1654 to present graphical and other information to a user. The control interface 1658 may receive commands from a user and convert them for submission to the processor 1652. In addition, an external interface 1662 may provide communication with the processor 1652, so as to enable near area communication of the mobile computing device 1650 with other devices. The external interface 1662 may provide, for example, for wired communication in some implementations, or for wireless communication in other implementations, and multiple interfaces may also be used.

The memory 1664 stores information within the mobile computing device 1650. The memory 1664 can be implemented as one or more of a computer-readable medium or media, a volatile memory unit or units, or a non-volatile memory unit or units. An expansion memory 1674 may also be provided and connected to the mobile computing device 1650 through an expansion interface 1672, which may include, for example, a SIMM (Single In Line Memory Module) card interface. The expansion memory 1674 may provide extra storage space for the mobile computing device 1650, or may also store applications or other information for the mobile computing device 1650. Specifically, the expansion memory 1674 may include instructions to carry out or supplement the processes described above, and may include secure information also. Thus, for example, the expansion memory 1674 may be provided as a security module for the mobile computing device 1650, and may be programmed with instructions that permit secure use of the mobile computing device 1650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 1652), perform one or more methods, such as those described above. The instructions can also be stored by one or more storage devices, such as one or more computer- or machine-readable mediums (for example, the memory 1664, the expansion memory 1674, or memory on the processor 1652). In some implementations, the instructions can be received in a propagated signal, for example, over the transceiver 1668 or the external interface 1662.

The mobile computing device 1650 may communicate wirelessly through the communication interface 1666, which may include digital signal processing circuitry where necessary. The communication interface 1666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1668 using a radio-frequency. In addition, short-range communication may occur, such as using a Bluetooth®, Wi-Fi™, or other such transceiver (not shown). In addition, a GPS (Global Positioning System) receiver module 1670 may provide additional navigation- and location-related wireless data to the mobile computing device 1650, which may be used as appropriate by applications running on the mobile computing device 1650.

The mobile computing device 1650 may also communicate audibly using an audio codec 1660, which may receive spoken information from a user and convert it to usable digital information. The audio codec 1660 may likewise generate audible sound for a user, such as through a speaker, e.g., in a handset of the mobile computing device 1650. Such sound may include sound from voice telephone calls, may include recorded sound (e.g., voice messages, music files, etc.) and may also include sound generated by applications operating on the mobile computing device 1650.

The mobile computing device 1650 may be implemented in a number of different forms, as shown in the figure. For example, it may be implemented as a cellular telephone 1680. It may also be implemented as part of a smart-phone 1682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In view of the structure, functions and apparatus of the systems and methods described here, in some implementations, a system and method for detailing subdivision surfaces. Having described certain implementations of methods and apparatus for detailing subdivision surfaces, it will now become apparent to one of skill in the art that other implementations incorporating the concepts of the disclosure may be used. Therefore, the disclosure should not be limited to certain implementations, but rather should be limited only by the spirit and scope of the following claims.

Having described various embodiments of the disclosed technology, it will now become apparent to one of skill in the art that other embodiments incorporating the concepts may be used. It is felt, therefore, that these embodiments should not be limited to the disclosed embodiments, but rather should be limited only by the spirit and scope of the following claims.

Throughout the description, where apparatus and systems are described as having, including, or comprising specific components, or where processes and methods are described as having, including, or comprising specific steps, it is contemplated that, additionally, there are apparatus, and systems of the disclosed technology that consist essentially of, or consist of the recited components, and that there are processes and methods according to the disclosed technology that consist essentially of, or consist of, the recited processing steps.

It should be understood that the order of steps or order for performing certain action is immaterial so long as the disclosed technology remains operable. Moreover, two or more steps or actions may be conducted simultaneously.

What is claimed is:

1. A method comprising:
    accessing, by a processor of a computing device, a subdivision surfacing geometry (SubD) model;
    converting, by the processor, at least a portion of a plurality of features of the SubD model to a voxel model;
    accessing, by the processor, a texture for application to the voxel model;
    combining, by the processor, the texture and the voxel model to create a textured voxel model;
    determining, by the processor, one or more displacement maps, wherein the one or more displacement maps are determined based at least in part on a difference between a surface portion of the textured voxel model and a surface portion of the SubD model; and applying, by the processor, the one or more displacement maps to the surface portion of the SubD model to determine a second SubD model, wherein the second SubD model is configured for manipulation while preserving an appearance or geometric placement of the added texture.

2. The method of claim 1, comprising:

determining, by the processor, prior to converting the SubD model to a voxel model, a polygonal mesh, wherein the polygonal mesh forms a cage surrounding the surface portion of the SubD model.

3. The method of claim 2, wherein converting at least a portion of a plurality of features of the SubD model to the voxel model comprises:

determining, by the processor, one or more vertex locations from one or more faces of the polygonal mesh;

determining, by the processor, based at least in part on the one or more vertex locations, a mesh surface; and converting, by the processor, the mesh surface into a plurality of voxels.

4. The method of claim 3, wherein determining the mesh surface comprises meshing the one or more vertex locations as quadrilaterals.

5. The method of claim 2, comprising:

refining, by the processor, the polygonal mesh, wherein refining comprises subdividing one or more features of the polygonal mesh to determine a refined polygonal mesh.

6. The method of claim 5, wherein the one or more features of the polygonal mesh includes at least one member selected from a group consisting of edges, faces, and vertices.

7. A system for texture manipulation on the surface a three-dimensional representation of a non-homogenous object comprising:

a processor; and a memory having stored thereon:

a voxel-based representation of the non-homogenous object, a sub subdivision surfacing geometry (SubD) representation of the non-homogenous object, and a set of instructions, wherein the instructions, when executed by the processor, cause the processor to:

apply, to the voxel-based representation of the non-homogenous model, a voxel-based representation of a texture, merge the voxel-based representation of the non-homogenous model with the voxel-based representation of the texture, capture a surface model of the merged voxel-based representation, and apply the texture, via the surface model, to the SubD representation.

8. The system of claim 7, wherein the instructions, when executed by the processor, further cause the processor to:

determine a polygonal mesh that forms a cage surrounding the surface portion of the SubD model.

9. The system of claim 8, wherein the instructions, when executed by the processor, further cause the processor to convert, prior to the memory having stored thereon the voxel-based representation, at least a portion of a plurality of features of the SubD representation to the voxel-based representation, including the processor being caused to:

determine one or more vertex locations from one or more faces of the polygonal mesh;

determine a mesh surface based at least in part on the one or more vertex locations; and convert the mesh surface into a plurality of voxels.

10. The system of claim 9, wherein the processor being caused to determine the mesh surface includes being caused to mesh the one or more vertex locations as quadrilaterals.

11. The system of claim 8, wherein the instructions, when executed by the processor, further cause the processor to:

refine the polygonal mesh, including the processor being caused to subdivide one or more features of the polygonal mesh to determine a refined polygonal mesh.

12. The system of claim 11, wherein the one or more features of the polygonal mesh includes at least one member selected from a group consisting of edges, faces, and vertices.

13. A non-transitory computer readable medium having instructions stored thereon, wherein the instructions, when executed by a processor, cause the processor to:

access a subdivision surfacing geometry (SubD) model;

convert at least a portion of a plurality of features of the SubD model to a voxel model;

access a texture for application to the voxel model;

combine the texture and the voxel model to create a textured voxel model;

determine one or more displacement maps, wherein the one or more displacement maps are determined based at least in part on a difference between a surface portion of the textured voxel model and a surface portion of the SubD model; and apply the one or more displacement maps to the surface portion of the SubD model to determine a second SubD model, wherein the second SubD model is configured for manipulation while preserving an appearance or geometric placement of the added texture.

14. The non-transitory computer readable medium of claim 13, wherein the instructions, when executed by the processor, further cause the processor to:

determine, prior to conversion of the SubD model to a voxel model, a polygonal mesh, wherein the polygonal mesh forms a cage surrounding the surface portion of the SubD model.

15. The non-transitory computer readable medium of claim 14, wherein the processor being caused to convert at least a portion of a plurality of features of the SubD model to the voxel model includes the processor being caused to:

determine one or more vertex locations from one or more faces of the polygonal mesh;

determine a mesh surface based at least in part on the one or more vertex locations; and convert the mesh surface into a plurality of voxels.

16. The non-transitory computer readable medium of claim 15, wherein the processor being caused to determine the mesh surface includes being caused to mesh the one or more vertex locations as quadrilaterals.

17. The non-transitory computer readable medium of claim 14, wherein the instructions, when executed by the processor, further cause the processor to:

refine the polygonal mesh, including the processor being caused to subdivide one or more features of the polygonal mesh to determine a refined polygonal mesh.

18. The non-transitory computer readable medium of claim 17, wherein the one or more features of the polygonal mesh includes at least one member selected from a group consisting of edges, faces, and vertices.

* * * * *